Patented Jan. 10, 1950

2,493,965

UNITED STATES PATENT OFFICE 2,493,965

EMULSION POLYMERIZATION OF STYRENE

John W. Haefele, Ridgewood, N. J., assignor to United States Rubber Company, New York, N. Y., a corporation of New Jersey No Drawing. Application January 29, 1947, Serial No. 725,165

2 Claims. (Cl. 260—23)

This invention relates to the emulsion polymerization of styrene and more particularly to the production of a polystyrene emulsion having high solids content.

Aqueous emulsions of polystyrene produced by ordinary polymerization methods normally have a solids content of considerably below fifty percent of the weight of the emulsion. When the proportion of styrene to water is increased to greater than a 55:45 ratio in the mixture prior to polymerization, the result upon polymerizing the styrene is to break the emulsion whereupon the polystyrene coagulates prematurely and the resulting polymerizate is not a homogeneous liquid adaptable for commercial dipping, spreading and coating operations. Previous suggestions for the production of polystyrene emulsions of high solids content, i. e. having over 50-55% of solids, based on the weight of the emulsion, have required expensive and complicated apparatus.

The present invention produces a high solids aqueous emulsion of polystyrene which does not coagulate prematurely and therefore may be utilized in dipping, spreading and coating operations. The polystyrene emulsion of this invention has enlarged particle size, and relatively low viscosity, e. g., 50 to 150 centipoises. The product is stable, smooth and creamy and the dried film formed therefrom is non-cracking and non-brittle.

According to the present invention, styrene is heated under polymerizing conditions as a mixture with a non-solvent liquid medium therefor, preferably water, in the presence of a soap, an inorganic salt, an alkali salt of dodecyl benzene sulfonic acid, and a plasticizer. The combined weights of the styrene and the plasticizer should be at least 50% of the total weight of the liquid system, in order to produce a high-solids polymer; and the quantities of styrene and plasticizer combined may run as high as 65%. The soaps which may be used include the alkali salts, such as sodium or potassium salts, of the various higher fatty acids, for example those long chain fatty acids having from 12 to 24 carbon atoms, e. g. lauric, tridecanoic, myristic, pentadecanoic, palmitic, margaric, stearic, oleic, linoleic, linolinic, arachidic, behenic, tetracosanoic. The inorganic salts include alkali or other metal salts of water-soluble or mineral acids, e. g. sodium sulfate, or potassium sulfate. The sulfonates include the sodium and potassium salts of dodecyl benzene sulfonic acid. It has been found convenient to introduce the salt and the alkyl-aryl sulfonate simultaneously as a prepared material known as "Nacconol NR", which is 50% sodium dodecyl benzene sulfonate and 50% sodium sulfate. The plasticizer may be any of the well known plasticizers for synthetic resins, such as di-alkyl phthalates, for example dimethyl, diethyl, dipropyl, diisopropyl, dibutyl, diisobutyl, diamyl, or dicyclohexyl phthalate; di-aryl phthalates, for example diphenyl phthalate, triaryl phosphates, such as tricresyl, triphenyl, or trinaphthyl phosphate; or mixtures of any of them.

The amounts of soap, sulfonate, and salt which may be used may be varied in accordance with the materials used and the properties desired in the final emulsion polymerizate, but, as shown in the examples below, it is important that the percentage of plasticizer be sufficient to prevent the emulsion or dispersion from coagulating, and it is also desired that the solids content of dispersed phase in the emulsion be at least 50% of the total weight of the emulsion. A convenient percentage range for the soap is from 1 to 5 parts by weight based on 100 parts of combined weight of the styrene plus the plasticizer. The salt may range between 1 and 2.5 parts by weight on the same basis, and the sulfonate may range from 1 to 4.5 parts by weight per 100 parts of styrene and plasticizer combined. The range of the plasticizer is preferably greater than about 20% based on the combined weight of the styrene and plasticizer, and quantities as high as 50% plasticizer may be utilized.

The experiments referred to in the examples show that styrene emulsion polymerizates which are initially compounded with the requisite quantities of soap, salt and sulfonate, but containing about 20% or less of plasticizer or in the absence of any plasticizer, tend to coagulate and are therefore rendered valueless for purposes of the invention, whereas such polymerized dispersions containing amounts of plasticizer in excess of approximately 20% when polymerized possess the requisite characteristics of high solids content (at least 50%, e. g. up to 63%), have enlarged particle size, low viscosity, smooth creaminess, stability, and form a non-cracking and non-brittle film when deposited.

In general, the polymerizing conditions may be varied somewhat, e. g. the temperatures during polymerization may vary between 30° C. and 70° C., although higher or lower temperatures may be used. Temperatures lower than 30° C. tend to retard the rate of reaction and temperatures higher than 70° C. have not produced any noticeable advantage. The combined weight of the styrene and plasticizer originally added is preferably at least 50% of the combined weight of the styrene and the plasticizer plus the water, i. e., the combined weight of the styrene and the plasticizer should be at least equal to the weight of the water. The reaction takes place in a closed vessel, and a conventional reaction catalyst (e. g. potassium persulfate) and reaction rectangular (e. g. dodecyl mercaptan) are added to the mix before beginning the reaction. The plasticizer is most conveniently added before the reaction is started, but if desired, it may be added at a later stage during the polymerization before coagulation is initiated. The reaction time may vary from 10 to 200 hours, depending upon the temperature and on the formulation of the emulsion.

In each of the examples listed below, the styrene emulsion was compounded according to one of the following formulations A, B or C, the parts being by weight:

| Ingredients | Formula | | |
|---|---|---|---|
| | A | B | C |
| Styrene+Plasticizer | 100 | 100 | 125 |
| Regulator (dodecyl mercaptan) | 0.3 | 0.3 | 0.3 |
| Catalyst (potassium persulfate) | 0.5 | 0.3 | 0.5 |
| Sodium dodecyl benzene sulfonate | 1.95 | 1.5 | 1.95 |
| Soap (potassium oleate) | 2.8 | 1.5 | 2.8 |
| Salt (sodium sulfate) | 1.95 | 1.5 | 1.95 |
| Water | 70.2 | 70.0 | 71.2 |

The above formulations were polymerized at 50° C. for varying periods of time, and with varying amounts of plasticizer, both as shown below. Plasticizer "X" is dibutyl phthalate and plasticizer "Y" is tricresyl phosphate. The result of polymerization is started for each example, and in the examples where coagulation did not take place, the total solids (T. S.) in the polystyrene emulsion is expressed in terms of the percent by weight of the solids related to the total weight of the emulsion.

| Example | Formula | Hours | Percent Plasticizer | Percent Styrene | Result |
|---|---|---|---|---|---|
| 1 | A | 65.3 | None | 100 | Coagulated. |
| 2 | A | 47 | 7%—X | 93 | Do. |
| 3 | A | 47 | 14%—X | 86 | Do. |
| 4 | A | 72 | 21%—X | 79 | 57.1% T. S. |
| 5 | B | 136.5 | None | 100 | Coagulated. |
| 6 | B | 40 | 7%—X | 93 | Do. |
| 7 | B | 91 | 14%—X | 86 | Do. |
| 8 | B | 88.5 | 28%—X | 72 | 56% T. S. |
| 9 | C | 94.8 | 50%—X | 50 | 62.7% T. S. |
| 10 | C | 117.8 | 36%—X | 64 | 63% T. S. |
| 11 | C | 72 | 34%—Y | 66 | 57.6% T. S. |
| 12 | B | 53.5 | 34%—X | 66 | 56.9% T. S. |
| 13 | B | 189.5 | 34%—Y | 66 | 55% T. S. |

Examples 14, 15 and 16 were compounded according to Formula A, except for the soap content and water content. In Example 14 the soap used was 3.9 parts potassium laurate (L) and 75.4 parts of water were added. In Example 15, the soap was 5.0 parts potassium palmitate (P) and 72.4 parts of water were added; and in Example 16, 3.9 parts potassium stearate (S) and 72.0 parts of water were used.

| Example | Formula | Hours | Per Cent Plasticizer | Per Cent Styrene | Result |
|---|---|---|---|---|---|
| 14 | A (L) | 138 | 25%—X | 75 | 50.5% T. S. |
| 15 | A (P) | 136 | 25%—X | 75 | 51.7% T. S. |
| 16 | A (S) | 136 | 25%—X | 75 | 53% T. S. |

The amount of plasticizer used in each example is expressed as the percent by weight of the plasticizer based on the combined weight of styrene and plasticizer. The results show that the emulsion polymerizates made according to the present invention with at least about 20% plasticizer yield satisfactory materials without coagulation.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of producing a polystyrene emulsion having high solids content which comprises heating a mixture of styrene and plasticizer therefor selected from the group consisting of dialkyl phthalates, diaryl phthalates and triaryl phosphates, the amount of plasticizer being over 20% and up to 50% based on the combined weight of styrene and said plasticizer, in water in the presence of 1 to 5 parts by weight of alkali soap of long chain fatty acid having from 12 to 24 carbon atoms and 1 to 2.5 parts by weight of alkali sulfate and 1 to 4.5 parts by weight of alkali dodecyl benzene sulfonate based on 100 parts of combined styrene and said plasticizer, and the combined weight of styrene and said plasticizer being 50 to 65% of the total weight of the liquid system.

2. The method of producing a polystyrene emulsion having high solids content which comprises heating a mixture of styrene and plasticizer therefor selected from the group consisting of dialkyl phthalates, diaryl phthalates and triaryl phosphates, the amount of plasticizer being over 20% and up to 50% based on the combined weight of styrene and said plasticizer, in water in the presence of 1 to 5 parts by weight of sodium soap of long chain fatty acid having from 12 to 24 carbon atoms and 1 to 2.5 parts by weight of sodium sulfate and 1 to 4.5 parts by weight of sodium dodecyl benzene sulfonate based on 100 parts of combined styrene and said plasticizer, and the combined weights of styrene and said plasticizer being 50 to 65% of the total weight of the liquid system.

JOHN W. HAEFELE.

REFERENCES CITED

The following references are of record in the file of this patent:

UNITED STATES PATENTS

| Number | Name | Date |
|---|---|---|
| 2,125,527 | Tyce | Aug. 2, 1938 |
| 2,388,600 | Collins | Nov. 6, 1945 |